F. LEONHARDT.
LIQUID GAGE.
APPLICATION FILED APR. 18, 1911.

1,006,105.

Patented Oct. 17, 1911.

Witnesses:
Casawear Young,
May Downey.

Inventor:
Frederick Leonhardt
By Oliphant & Young
Attorneys.

UNITED STATES PATENT OFFICE.

FREDERICK LEONHARDT, OF SHEBOYGAN, WISCONSIN.

LIQUID-GAGE.

1,006,105.　　　　　Specification of Letters Patent.　　Patented Oct. 17, 1911.

Application filed April 18, 1911. Serial No. 621,808.

*To all whom it may concern:*

Be it known that I, FREDERICK LEONHARDT, a citizen of the United States, and resident of Sheboygan, in the county of Sheboygan and State of Wisconsin, have invented certain new and useful Improvements in Liquid-Gages; and I do hereby declare that the following is a full, clear, and exact description thereof.

The object of my invetnion is to provide a simple, economical and durable sight feed gage for liquids, the especial advantage being the arrangement whereby the transparent feed tube is protected and should a break thereof occur fragments will be confined and thus eliminate danger incidental to escape thereof.

Specific objects of my invention are to provide a packing joint between the metal and glass members whereby the same are capable of expansion and contraction, and to provide an inner and outer glass tube both of which are incased in a metallic skeleton jacket and telescoped within each other to form a dead air space, the outer protecting tube being loosely fitted and held in place with no provision for tight joints, whereby strain upon the same is eliminated.

With the above objects in view the invention consists in certain peculiarities of construction and combination of parts as hereinafter set forth with reference to the accompanying drawings and subsequently claimed.

Figure 1:
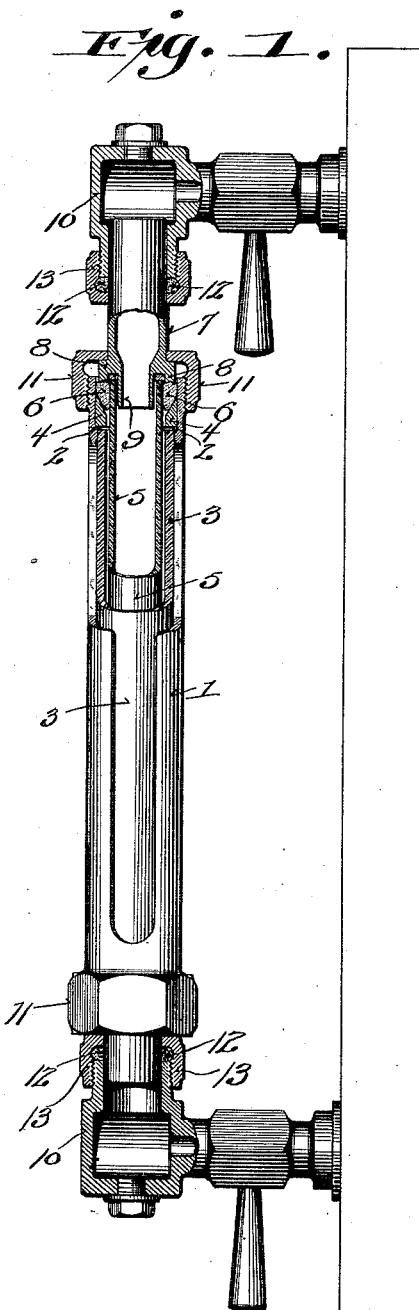
Figure 2:
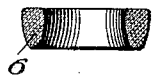

In the drawings Figure 1 represents an elevation of a gage partly broken away and partly in section embodying the features of my invention, and Fig. 2, a detail cross-sectional view of a packing gasket employed in carrying out the invention.

Referring by characters to the drawings, 1 represents a metallic tubular skeleton jacket provided with threaded ends and inner shoulders 2 adjacent to said ends. A glass protecting tube 3 is loosely fitted into the bore of the jacket, the length of which protecting tube is less than the distance between the shoulders 2, whereby longitudinal play of said protecting tube is provided for. After the protecting tube 3 is inserted in place metallic rings 4 of the same outer diameter as the bore of the jacket are seated upon the jacket shoulders, said metallic rings having inner beveled faces and oppositely disposed straight faces which serve to limit play of the protecting tube. Both ends of the gage are similarly packed and for clearness in the description the packing joint of one end of the same only will be described. A glass inner feed tube 5 is telescoped within the protecting tube, the outer diameter of which feed tube is less than the inner diameter of the protecting tube. Thus between the walls of the same there is a dead air space whereby the inner tube is shielded against sudden variations of temperature between the surrounding air and liquid contained therein. Hence it will be apparent that the liability of damage to the feed tube is practically eliminated. The feed tube 5 is approximately of the same length as the jacket 1 and is of such diameter that it does not contact with the bore of the metallic ring 4 through which it passes. In order to form a tight joint between the feed tube end and protecting jacket, a flexible packing gasket 6 is provided, which gasket is expanded over the end of the feed tube and is seated upon the beveled face of the ring. The gaskets employed for packing both the ends of the feed-tube glass as shown in Fig. 2 are wedge-shaped in cross-section, the upper face or base of each gasket being flat.

A coupling thimble 7, having a coupling flange 8 adjacent to its lower end and a reduced nozzle 9 extending from the flange base, is provided for forming a union between the gage and each holder 10 of a reservoir, the flange 8 having a circular grooved edge as shown. The wedge-shaped inner face of the ring 4 is arranged to be engaged by the outer wedge-shaped face of the gasket when said gasket is expanded over the end of the tube, the gasket being compressed in its seat by engagement of the grooved edge of flange 8 with the flat base of said gasket whereby a tight joint is formed.

In assembling the parts the nozzle 9 of the coupling 7 is inserted into the end of the feed tube and being of less diameter than the inner diameter thereof, a clearance between said nozzle and glass at this point is had, whereby the tube is not subjected to strain. The coupling thimble flange 8 enters between the feed tube and mouth of the jacket, but does not contact with the surface of said feed tube, its grooved lower edge engaging the flat upper face of the gasket, whereby the latter is compressed. This compression of the gasket is effected through a coupling nut 11 that engages a shoulder of the cupped flange 8 and is in threaded union with the jacket end. Hence when the coupling nut is turned down, the coupling thimble flange 8 will cause the gasket to be expanded laterally and thus tighten about the feed tube to insure a perfect union at this point.

In order to protect the end of the feed tube 5 which fits into the recess of flange 8, in practice it is desirable to insert a rubber gasket at the base of said flange 8, which gasket is fitted over the nozzle 9. By thus protecting the exposed inner surface of the glass from steam the life of said glass is insured as it has been found that the ends of such gages when not glazed and subjected to steam will slough or rot away. Furthermore the grooved edge of the flange 8 being embedded into the gasket will thus form a double contact surface to insure a perfect union between said gasket and flange edge, whereby leakage at this point is reduced to a minimum.

The smooth ends of the coupling thimbles 7 are inserted into the reservoir holders 10 and a tight slip joint is made therebetween by a washer 12 and nut 13, a set of which latter is in threaded engagement with either holder.

I claim:—

A liquid gage comprising a metallic tubular skeleton jacket having threaded ends and internal shoulders adjacent thereto, a glass protecting tube loosely mounted within the jacket, the length of the protecting tube being less than the distance between the jacket shoulders, metal rings seated upon the jacket shoulders having inwardly tapered faces, a glass feed tube fitted within the protecting tube, the feed tube being of lesser diameter than the inner diameter of the protecting tube whereby a dead air space is formed therebetween, packing gaskets fitted over the ends of the feed tube and adapted to seat upon the tapered faces of the rings, coupling thimbles having cup-like flanges extending therefrom for engagement with faces of the packing-gaskets, centrally disposed contracted nipples depending from the flanges of the coupling members and projecting into the glass inner tube, and coupling nuts engageable with the thimble flanges and in threaded union with the jacket ends.

In testimony that I claim the foregoing I have hereunto set my hand at Sheboygan in the county of Sheboygan and State of Wisconsin in the presence of two witnesses.

FREDERICK LEONHARDT.

Witnesses:
   JULIUS KROOS,
   ADOLPH PFISTER.

---

Copies of this patent may be obtained for five cents each, by addressing the "Commissioner of Patents, Washington, D. C."